US012763410B2

(12) United States Patent
Peng et al.

(10) Patent No.: US 12,763,410 B2
(45) Date of Patent: Oct. 13, 2026

(54) BATTERY MODULE AND ELECTRIC DEVICE

(71) Applicant: NINGDE AMPEREX TECHNOLOGY LIMITED, Ningde City (CN)

(72) Inventors: Fanggui Peng, Dongguan City (CN); Pengcheng Yang, Dongguan City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 800 days.

(21) Appl. No.: 17/991,341

(22) Filed: Nov. 21, 2022

(65) Prior Publication Data

US 2023/0163385 A1 May 25, 2023

(30) Foreign Application Priority Data

Nov. 22, 2021 (CN) ......................... 202111385544.0

(51) Int. Cl.
*H01M 50/178* (2021.01)
*H01M 10/653* (2014.01)
*H01M 50/105* (2021.01)
*H01M 50/284* (2021.01)

(52) U.S. Cl.
CPC ....... *H01M 50/178* (2021.01); *H01M 10/653* (2015.04); *H01M 50/105* (2021.01); *H01M 50/284* (2021.01)

(58) Field of Classification Search
CPC ................................................... H01M 50/178
See application file for complete search history.

(56) References Cited

U.S. PATENT DOCUMENTS

| | | | | |
|---|---|---|---|---|
| 8,399,118 | B2 * | 3/2013 | Gadawski | H01M 10/486 429/120 |
| 8,852,778 | B2 * | 10/2014 | Payne | H01M 10/63 429/120 |
| 10,312,554 | B2 * | 6/2019 | Droste | H01M 10/643 |
| 11,258,116 | B2 * | 2/2022 | Ahn | H01M 50/211 |
| 12,206,081 | B2 * | 1/2025 | Hooper | H01M 10/653 |
| 2019/0173067 | A1 | 6/2019 | Nishimata | |
| 2020/0220240 | A1 * | 7/2020 | Cheng | H01M 10/6556 |
| 2020/0335839 | A1 * | 10/2020 | Hekmat | H01M 10/659 |
| 2021/0320385 | A1 | 10/2021 | Kim et al. | |

FOREIGN PATENT DOCUMENTS

| | | | |
|---|---|---|---|
| AT | 511666 | B1 | 5/2015 |
| CN | 208738326 | U | 4/2019 |
| CN | 210136918 | U | 3/2020 |
| CN | 111653697 | A | 9/2020 |
| CN | 111742440 | A | 10/2020 |
| CN | 212412126 | U | 1/2021 |
| CN | 112670635 | A | 4/2021 |
| CN | 112787043 | A | 5/2021 |
| CN | 213752868 | U | 7/2021 |
| CN | 113206320 | A | 8/2021 |
| CN | 113517505 | A | 10/2021 |
| JP | 2011258540 | A | 12/2011 |
| KR | 20150137841 | A | 12/2015 |
| KR | 20170034560 | A | 3/2017 |
| KR | 20170060451 | A | 6/2017 |
| KR | 20180013460 | A | 2/2018 |

OTHER PUBLICATIONS

Office Action dated Nov. 23, 2023, issued in counterpart CN Application No. 202111385544.0. (11 pages).

Extended (Supplementary)European Search Report dated Apr. 17, 2023, issued in counterpart EP Application No. 22208754.6. (8 pages).

* cited by examiner

*Primary Examiner* — Jonathan Johnson
(74) *Attorney, Agent, or Firm* — WHDA, LLP

(57) ABSTRACT

A battery module includes a housing assembly, a cell assembly, a circuit board, and a first connecting member. The housing assembly includes a first side wall and a second side wall. The first side wall is provided with a first through hole. The second side wall is provided with a second through hole. The cell assembly is accommodated in the housing assembly. The cell assembly includes cells. Each cell includes an electrode terminal. The circuit board connects to the electrode terminal. The first connecting member connects to the circuit board. The first connecting member is disposed in the first through hole and the second through hole. The first connecting member is provided with a first channel. The first channel communicates with the first through hole and the second through hole.

19 Claims, 14 Drawing Sheets

BATTERY MODULE AND ELECTRIC DEVICE

CROSS REFERENCE TO THE RELATED APPLICATIONS

The present application claims priority to Chinese Patent Application No. 202111385544.0, filed on 22 Nov. 2021, the disclosure of which is hereby incorporated by reference in its entirety.

TECHNICAL FIELD

This application relates to the field of energy storage technologies, and in particular, to a battery module and an electric device.

BACKGROUND

During use of a battery, a circuit board of the battery generates a large amount of heat. To avoid excessively high temperature of the battery, the battery needs to be subjected to heat dissipation. A current conventional heat dissipation method is to add a heat dissipation member between cells, but with such heat dissipation method, limited heat is dissipated for the circuit board.

SUMMARY

In view of this, it is necessary to provide a battery module and an electric device to improve heat dissipation for a circuit board.

An embodiment of this application provides a battery module, including a housing assembly, a cell assembly, a circuit board, and a first connecting member. The housing assembly includes a first side wall and a second side wall. The first side wall is provided with a first through hole. The second side wall is provided with a second through hole. The cell assembly is accommodated in the housing assembly. The cell assembly includes cells. Each cell includes a cell housing, an electrode assembly disposed in the cell housing, and an electrode terminal connecting to the electrode assembly and led out of the cell housing. The circuit board connects to the electrode terminal. The first connecting member connects to the circuit board. The first connecting member is disposed in the first through hole and the second through hole. The first connecting member is provided with a first channel. The first channel communicates with the first through hole and the second through hole.

The first connecting member dissipates heat of the circuit board out of the first through hole and the second through hole to an external environment via the first channel, improving heat dissipation for the circuit board, thereby lowering temperature of the battery module.

Optionally, in some embodiments of this application, the first side wall and the second side wall are disposed opposite to each other in a first direction. The first side wall is provided with a first protrusion facing towards the second side wall. The first protrusion is at least partially disposed in the first channel.

Optionally, in some embodiments of this application, the first side wall is provided with a first protrusion facing towards the second side wall, and the first protrusion connects to an edge of the first through hole. The first protrusion is provided with a first hole. The first hole communicates with the first through hole. The first protrusion is at least partially disposed in the first channel, or the first connecting member is partially located in the first hole.

Optionally, in some embodiments of this application, the first connecting member is partially located in the first hole. An adhesive is provided between the first protrusion and the first connecting member. A gap between the first protrusion and the first connecting member is sealed by the adhesive, so that water entering the housing assembly can be reduced, thereby reducing a risk of short circuit caused by the water entering the battery module.

Optionally, the second side wall is provided with a second protrusion facing towards the first side wall, and the second protrusion is at least partially disposed in the first channel.

Optionally, in some embodiments of this application, the second side wall is provided with a second protrusion facing towards the first side wall. The second protrusion connects to an edge of the second through hole. The second protrusion is provided with a second hole. The second hole communicates with the second through hole. The second protrusion is at least partially disposed in the first channel, or the first connecting member is partially located in the second hole.

Optionally, in some embodiments of this application, the first connecting member is partially located in the second hole. An adhesive is provided between the second protrusion and the first connecting member. A gap between the second protrusion and the first connecting member is sealed by the adhesive, so that water entering the housing assembly can be reduced, thereby reducing a risk of short circuit caused by the water entering the battery module.

Optionally, in some embodiments of this application, the first protrusion is disposed in the first channel. The first connecting member is connected to the first side wall.

Optionally, in some embodiments of this application, the first connecting member is in contact connection with the first side wall.

Optionally, in some embodiments of this application, the first connecting member is connected to the first side wall through glue and the like.

Optionally, in some embodiments of this application, in the first direction X, a projection of the first through hole is larger than and covers a projection of the second through hole. A diameter of the first through hole being larger than a diameter of the second through hole enhances convection of air, further improving heat dissipation.

Optionally, in some embodiments of this application, a thermally conductive member is further included. The thermally conductive member is disposed between the first connecting member and the electrode terminal.

Optionally, in some embodiments of this application, in a second direction perpendicular to the first direction, the circuit board is provided with a plurality of third through holes. One terminal passes through one of the plurality of third through hole to connect to the circuit board. In a third direction, a projection of the first connecting member is located between projections of adjacent third through holes. The third direction is perpendicular to the first direction and the second direction, implementing better heat dissipation for electrode terminals located on two sides of the first connecting member.

Optionally, in some embodiments of this application, in the third direction, the projection of the first connecting member and the projection of the third through hole are spaced apart from each other, reducing intervention of the first connecting member and the electrode terminal.

Optionally, in some embodiments of this application, a second connecting member is further included. The second connecting member includes a first component disposed between adjacent cells. The first component connects to the first connecting member. The first side wall and the second side wall are disposed opposite each other in the first direction, and in the second direction perpendicular to the first direction, a projection of the first component and a projection of the cell housing at least partially overlap. The first component being disposed between the adjacent cells increases a contact area between the first component and the cell housing, thereby improving heat dissipation for the adjacent cells.

Optionally, in some embodiments of this application, the second connecting member further includes a second component connecting to the first component. The second component extends from between adjacent cells. The second component is bent toward the adjacent cells and is in contact connection with the cell. In the first direction, a projection of the second component and a projection of the adjacent cells at least partially overlap. Provision of the second component increases a contact area between the second connecting member and the cell housing, thereby further improving heat dissipation for the cell.

Optionally, in some embodiments of this application, the second component is in contact connection with the housing assembly. Heat is transferred to the housing assembly and is dissipated through the housing assembly, thereby further improving heat dissipation for the battery module.

Optionally, in some embodiments of this application, the first connecting member and the second connecting member are integrally formed through bending to enhance structural strength of the first connecting member and the second connecting member.

Optionally, in some embodiments of this application, surfaces of the first connecting member and the second connecting member are provided with an insulation layer.

Optionally, in some embodiments of this application, the cell housing includes a first portion and a second portion. The electrode assembly is disposed on the first portion. The second portion connects to the first portion. The electrode terminal extends from the second portion. The first portion and the second portion fit to form a third depression. The first connecting member is at least partially disposed in the third depression.

Optionally, in some embodiments of this application, a first structural member is further included. The first structural member is provided with a fourth depression. The circuit board is disposed in the fourth depression. The first structural member is provided with a first opening and a second opening. The first connecting member is disposed at the first opening and the second opening. The first connecting member is at least partially located in the second depression.

An embodiment of this application further provides an electric device, including the battery module according to any one of the foregoing embodiments.

In the foregoing battery module and electric device, the first connecting member dissipates heat of the circuit board and the cell assembly out of the first through hole and the second through hole to an external environment via the first channel, improving heat dissipation for the circuit board, thereby lowering temperature of the battery module.

Figure 1:
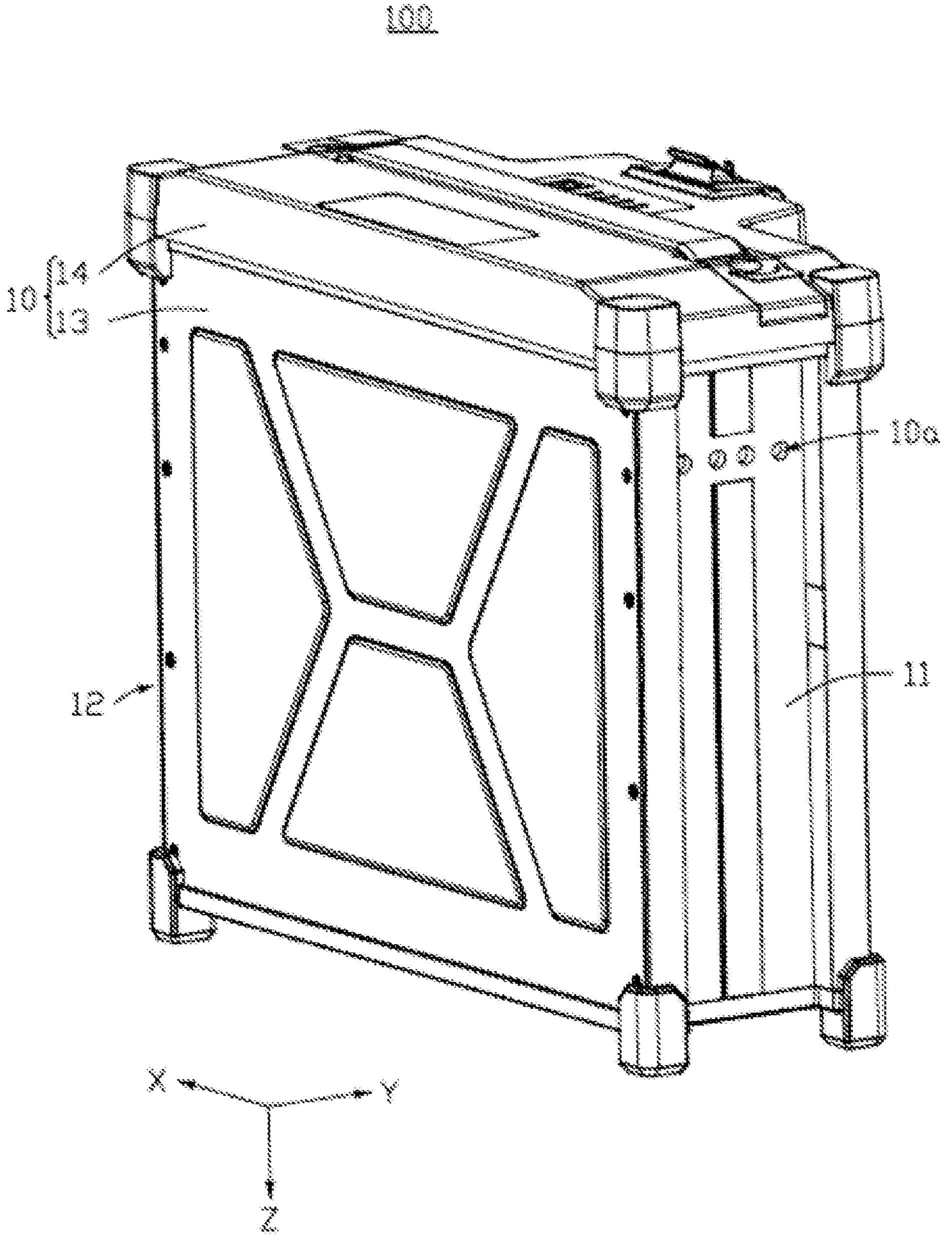
FIG. 1 is a structural schematic diagram of a battery module according to some embodiments.

REFERENCE SIGNS OF MAIN COMPONENTS battery module 100
housing assembly 10
first through hole **10*a***
second through hole **10*b***
first side wall 11
first protrusion 111
first hole 1110
second side wall 12
second protrusion 121
second hole 1210
first housing 13
second housing 14
cell assembly 20
cell 21
first side face **21*a***
second side face **21*b***
third side face **21*c***
cell housing 211
first portion **211*a***
second portion **211*b***
third depression **211*c***
electrode terminal 212
welding portion **212*a***
first terminal **212*b***
second terminal **212*c***
circuit board 30
third through hole 31
first connecting member 40
first channel **40*a***
first structural member 50
top plate **50*a***
side plate **50*b***
fourth depression 51 first opening 52
second opening 53
second connecting member 60
first component 61
fourth adhesive 61*a*
first connecting portion 611
second connecting portion 612
second component 62
third connecting portion 621
fourth connecting portion 622
electric device 200
first direction X
second direction Y
third direction Z This application will be further described with reference to the accompanying drawings in the following specific embodiments.

DETAILED DESCRIPTION

The following describes the technical solutions in the embodiments of this application with reference to the accompanying drawings in the embodiments of this application. Apparently, the described embodiments are only some rather than all of the embodiments of this application.

When a component is deemed as being "provided on" another component, it may be directly provided on the another component, or there may be a component in between. When a component is deemed as being "connected to" another component, it may be directly connected to the another component, or there may be a component in between.

Unless otherwise defined, all technical and scientific terms used herein shall have the same meanings as commonly understood by those skilled in the art to which this application belongs. The terms used herein in the specification of this application are only used to describe specific embodiments, and are not intended to limit this application. The term "and/or" used herein includes any and all combinations of one or more related listed items.

It can be understood that when two components are parallel with or perpendicular to each other, a specified included angle may be present between the two components, and the included angle between the two components have an allowable tolerance of 0-±5%. For example, when two components that are perpendicular to each other have a tolerance, and one component tilts close to or away from the other component, a tolerance range between the two components is greater than 0° and is less than or equal to 4.5°. When projections of two components are the same or overlap, the two components have an allowable tolerance of 0-±10%. For example, one component has the same projection as the other component in shape, and projection areas have a tolerance of 0-±10%.

The following describes in detail some embodiments of this application with reference to the accompanying drawings. In absence of conflicts, the following embodiments and features in the embodiments may be combined with each other.

Figure 2:
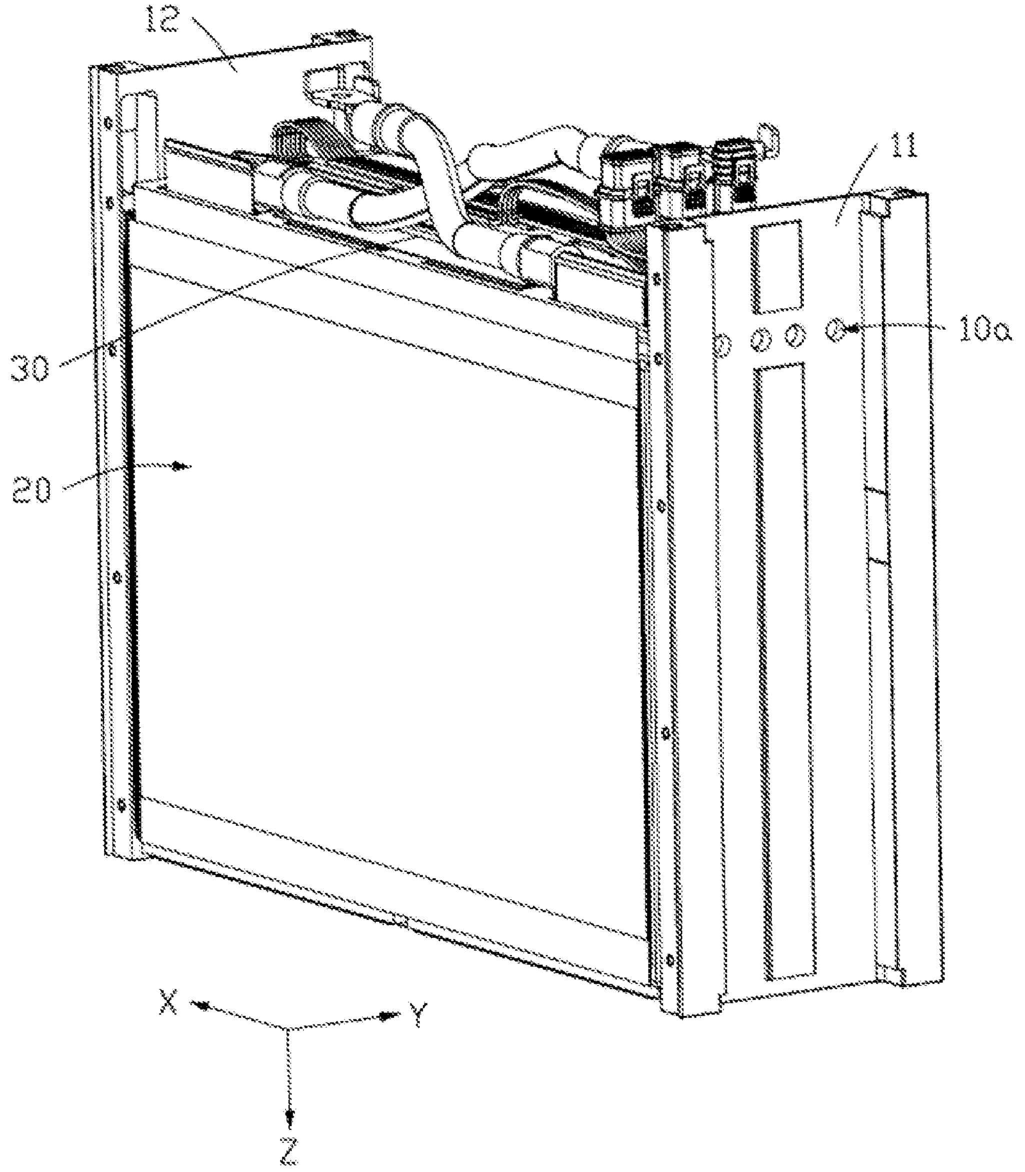
FIG. 2 is a schematic diagram of a structure inside a battery module according to some embodiments.
Figure 3:
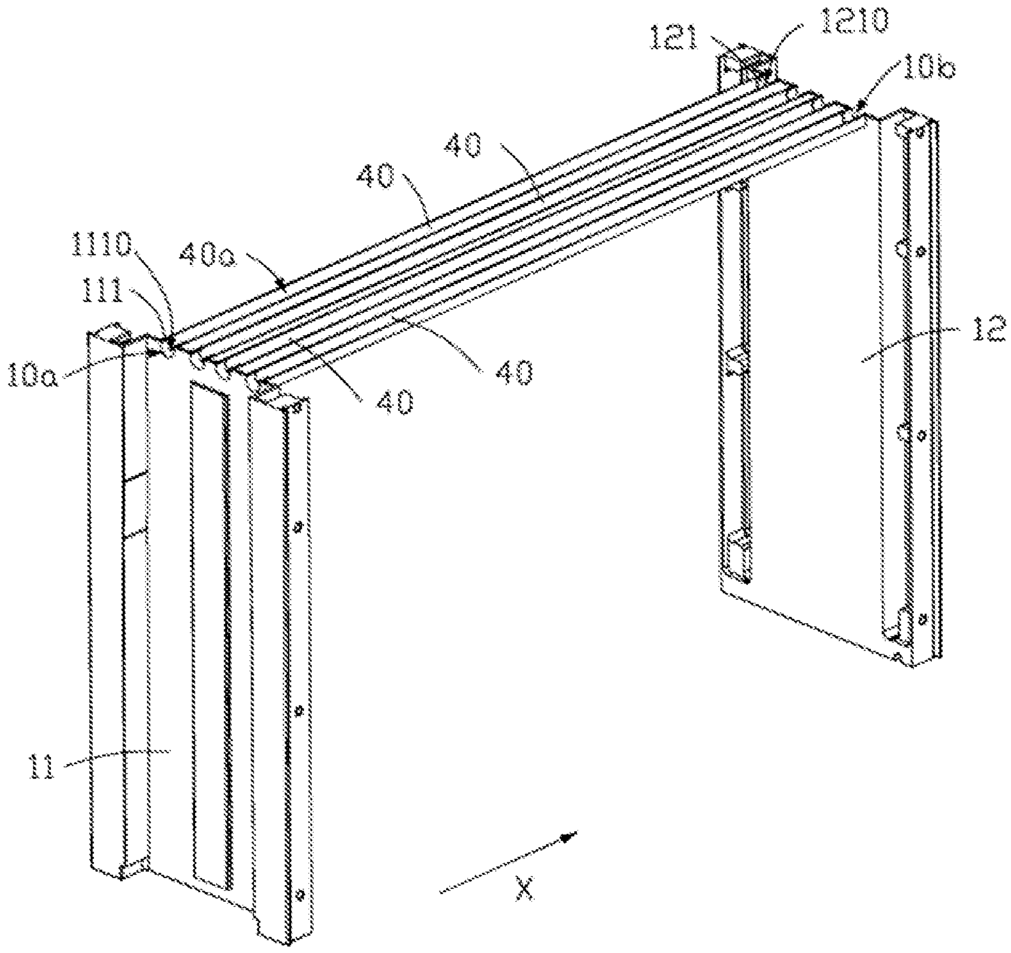
FIG. 3 is a schematic cross-sectional diagram of a first connecting member according to some embodiments.

Referring to FIG. 1, FIG. 2, and FIG. 3, an embodiment of this application provides a battery module 100, including a housing assembly 10, a cell assembly 20, a circuit board 30, and a first connecting member 40. The housing assembly 10 is provided with a first through hole 10*a* and a second through hole 10*b*, where the first through hole 10*a* and the second through hole 10*b* communicate with the outside. The cell assembly 20 is disposed in the housing assembly 10. The circuit board 30 is disposed in the housing assembly 10 and connects to the cell assembly 20. The first connecting member 40 is located below the circuit board 30, the first connecting member 40 is provided with a first channel 40*a*, and the first channel 40*a* communicates with the first through hole 10*a* and the second through hole 10*b*. The first connecting member 40 dissipates heat of the circuit board 30 and the cell assembly 20 out of the first through hole 10*a* and the second through hole 10*b* to an external environment via the first channel 40*a*, improving heat dissipation for the circuit board 30, thereby lowering temperature of the battery module 100.

In an embodiment, the first connecting member 40 is in contact connection with the circuit board 30. In another embodiment, a gap is provided between the first connecting member 40 and the circuit board 30. In another embodiment, the first connecting member 40 and the circuit board 30 are connected via the thermally conductive member. Optionally, the thermally conductive member includes at least one of a thermally conductive adhesive or a thermally conductive sheet.

In an embodiment, the battery module 100 may use outside air to take away heat of the circuit board 30 and the cell assembly 20 through flow of air. In an embodiment, the battery module 100 may be applied to a device that is in a static state during use, and when the battery module 100 is in a static state, heat dissipation can be implemented through natural air flow or an external air cooling device. In an embodiment, the battery module 100 may be applied to a device that is in a dynamic state during use, for example, a drone or an electric motor bicycle. Because air flow velocity is quicker during moving of the device, quick heat dissipation for the battery module 100 can be implemented.

The housing assembly 10 includes a first side wall 11 and a second side wall 12, the first through hole 10*a* is provided on the first side wall 11, and the second through hole 10*b* is provided on the second side wall 12. In an embodiment, the first side wall 11 and the second side wall 12 are disposed opposite each other in a first direction X. In the first direction X, the first through hole 10*a* passes through the first side wall 11, and the second through hole 10*b* passes through the second side wall 12. In an embodiment, the first through hole 10*a* and the second through hole 10*b* are both provided in plurality and are the same in quantity, and in the first direction X, a projection of the first through hole 10*a* and a projection of the second through hole 10*b* overlap. When the battery module 100 moves in the first direction X or an air flow direction of the external air cooling device is in the first direction X, the first through hole 10*a* is an air inlet, and the second through hole 10*b* is an air outlet. Air enters through the first through hole 10*a*, flows through the first channel 40*a*, and flows out of the second through hole 10*b*, improving heat dissipation. It can be understood that when the battery module 100 moves in a direction opposite to the first direction X or an air flow direction of the external air cooling device is in a direction opposite to the first direction X, the first through hole 10*a* is an air outlet, and the second through hole 10*b* is an air inlet.

In an embodiment, in the first direction X, a projection of the first through hole 10*a* is larger than and covers a projection of the second through hole 10*b*. When the battery module 100 moves in the first direction X or an air flow direction of the external air cooling device is in the first direction X, the first through hole 10*a* is an air inlet, and the second through hole 10*b* is an air outlet, with a diameter of the first through hole 10*a* being larger than a diameter of the second through hole 10*b*, so as to enhance convection of air, further improving heat dissipation.

In another embodiment, the first through hole 10*a* and the second through hole 10*b* are different in quantity. One first through hole 10*a* corresponds to a plurality of second through holes 10*b*, or one second through hole 10*b* corresponds to a plurality of first through holes 10*a*. For example, one first through hole 10*a* corresponds to two second through holes 10*b*, one end of the first connecting member 40 is disposed in the first through hole 10*a*, and another end thereof is provided with two branches, where the two branches are both provided with the first channel 40*a*, and the two branches are correspondingly disposed in the two second through holes 10*b*.

In an embodiment, the housing assembly 10 includes a first housing 13 and a second housing 14. The first housing 13 includes a first side wall 11 and a second side wall 12. The first housing 13 has a first space, and the cell assembly 20 is disposed in the first space. The second housing 14 connects to the first housing 13 to enclose the first space.

In an embodiment, the second housing 14 has a second space, and the cell assembly 20 is at least partially disposed in the second space. In an embodiment, the first housing 13 and the second housing 14 are connected through a snap-fitted manner such as a fastener fitting a fastening hole. In another embodiment, the first housing 13 and the second housing 14 may alternatively be fixedly connected through a fastener such as a screw or a bonding manner such as bonding through adhesive.

Figure 4:
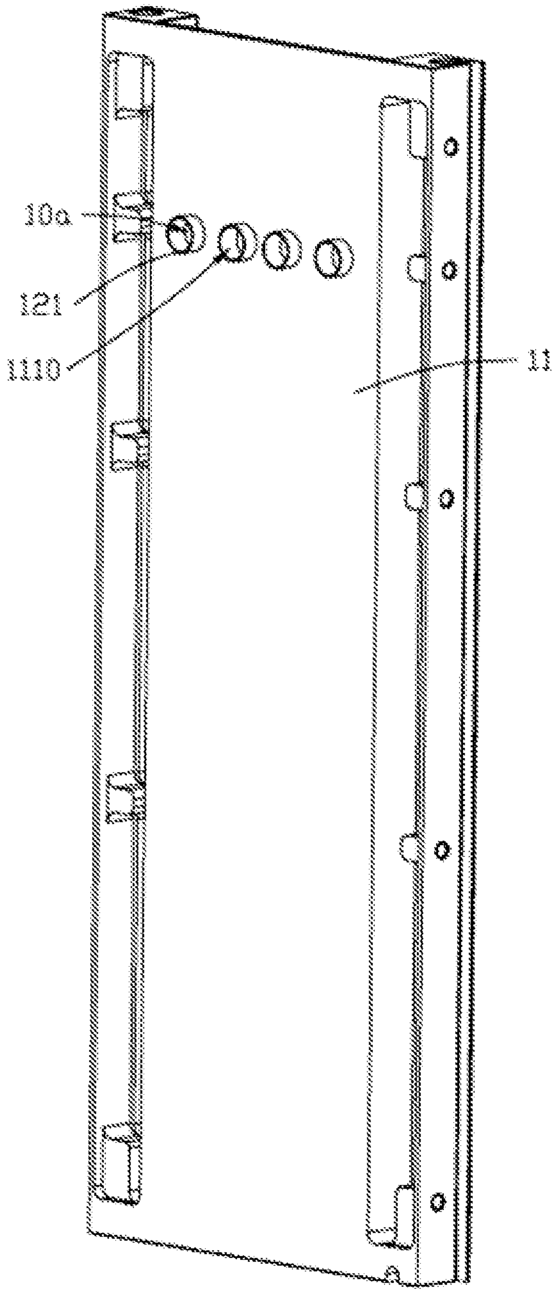
FIG. 4 is a structural schematic diagram of a first side wall according to some embodiments.

Referring to FIG. 3 and FIG. 4, in an embodiment, the first side wall 11 is provided with a first protrusion 111, the first protrusion 111 is disposed facing towards the second side wall 12, and the first protrusion 111 is at least partially disposed in the first channel 40*a*. Optionally, the first protrusion 111 is disposed in the first direction X.

Optionally, the first protrusion 111 is disposed surrounding part of a periphery of the first through hole 10*a*, and the first protrusion 111 is at least partially disposed in the first channel 40*a*. The first protrusion 111 is connected to the first connecting member 40 through a first adhesive (not shown in the figure) to fasten the first connecting member 40. Optionally, the first protrusion 111 is disposed in the first channel 40*a*, and the first connecting member 40 is connected to the first side wall 11. Optionally, the first connecting member 40 is in contact connection with the first side wall 11. Optionally, the first connecting member 40 is connected to the first side wall 11 through glue and the like.

Optionally, the first protrusion 111 is disposed surrounding the periphery of the first through hole 10*a*. Further, the first protrusion 111 is connected to an edge of the first through hole 10*a* in a surrounding manner. The first protrusion 111 is at least partially disposed in the first channel 40*a*. The first protrusion 111 connects to the first connecting member 40 and is disposed in the first channel 40*a*. The first protrusion 111 is provided with a first hole 1110, where the first hole 1110 communicates with the first through hole 10*a*. A first adhesive is provided between the first protrusion 111 and the first connecting member 40, and a gap between the first protrusion 111 and the first connecting member 40 is sealed by the first adhesive, so that water entering the housing assembly 10 can be reduced, thereby reducing a risk of short circuit caused by the water entering the battery module 100. Optionally, the first adhesive includes a sealant. Optionally, the first protrusion 111 is disposed in the first channel 40*a*, and the first connecting member 40 is connected to the first side wall 11. Optionally, the first connecting member 40 is in contact connection with the first side wall 11. Optionally, the first connecting member 40 is connected to the first side wall 11 through glue and the like.

In another embodiment, the first connecting member 40 is partially located in the first hole 1110. An adhesive is provided between the first protrusion 111 and the first connecting member 40, and a gap between the first protrusion 111 and the first connecting member 40 is sealed through by adhesive, so that water entering the housing assembly 10 can be reduced, thereby reducing a risk of short circuit caused by the water entering the battery module 100. Optionally, the adhesive includes a sealant.

In another embodiment, a surface of the first side wall 11 facing towards the second side wall 12 is provided with a first depression (not shown in the figure), and one end of the first connecting member 40 is disposed in the first depression. Optionally, the first depression is disposed surrounding the periphery of the first through hole 10*a*. Optionally, a first adhesive is provided between the first depression and the first connecting member 40. A gap between the first depression and the first connecting member 40 is sealed by the first adhesive, so that water entering the housing assembly 10 can be reduced, thereby reducing a risk of short circuit caused by the water entering the battery module 100.

In an embodiment, the second side wall 12 is provided with a second protrusion 121, the second protrusion 121 is disposed facing towards the first side wall 11, and the second protrusion 121 is at least partially disposed in the first channel 40*a* and may be used to fasten the first connecting member 40. Optionally, the second protrusion 121 is disposed in a direction opposite to the first direction X.

Optionally, the second protrusion 121 is disposed surrounding part of a periphery of the second through hole 10*b*, and the second protrusion 121 is at least partially disposed in the first channel 40*a*. The second protrusion 121 is connected to the first connecting member 40 through a second adhesive (not shown in the figure) to fasten the first connecting member 40. Optionally, the second protrusion 121 is disposed in the first channel 40*a*, and the first connecting member 40 is connected to the second side wall 12. Optionally, the first connecting member 40 is in contact connection with the second side wall 12. Optionally, the first connecting member 40 is connected to the second side wall 12 through glue and the like.

Optionally, the second protrusion 121 is disposed surrounding the periphery of the second through hole 10*b*. Further, the second protrusion 121 is connected to an edge of the second through hole 10*b* in a surrounding manner. The second protrusion 121 is at least partially disposed in the first channel 40*a*. The second protrusion 121 is connected to one end of the first connecting member 40 away from the first protrusion 111. The second protrusion 121 is disposed in the first channel 40*a*. The second protrusion 121 is provided with a second hole 1210, where the second hole 1210 communicates with the second through hole 10*b*. A second adhesive is provided between the second protrusion 121 and the first connecting member 40, and a gap between the second protrusion 121 and the first connecting member 40 is sealed by the second adhesive, so that water entering the housing assembly 10 can be reduced, thereby reducing a risk of short circuit caused by the water entering the battery module 100. Optionally, the second adhesive includes a sealant. Optionally, the second protrusion 121 is disposed in the first channel 40*a*, and the first connecting member 40 is connected to the second side wall 12. Optionally, the first connecting member 40 is in contact connection with the second side wall 12. Optionally, the first connecting member 40 is connected to the second side wall 12 through glue and the like.

In another embodiment, the first connecting member 40 is partially located in the second hole 1210. An adhesive is provided between the second protrusion 121 and the first connecting member 40, and a gap between the second protrusion 121 and the first connecting member 40 is sealed by the adhesive, so that water entering the housing assembly 10 can be reduced, thereby reducing a risk of short circuit caused by the water entering the battery module 100. Optionally, the adhesive includes a sealant.

In another embodiment, a surface of the second side wall 12 facing towards the first side wall 11 is provided with a second depression (not shown in the figure), and the second depression and the first depression fit to fasten two ends of the first connecting member 40.

Figure 5:
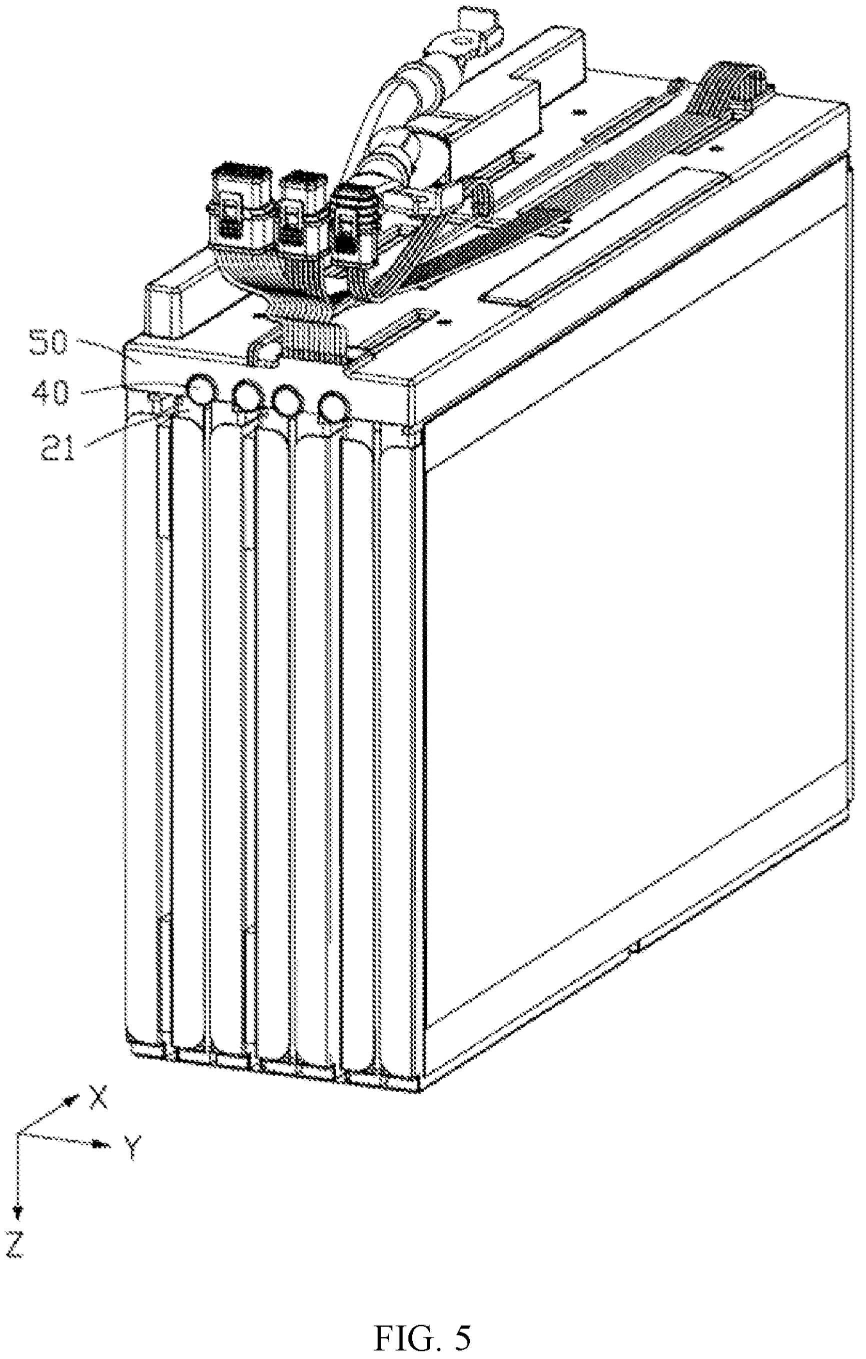
FIG. 5 is a structural schematic diagram of a cell assembly and a first connecting member according to some embodiments.
Figure 6:
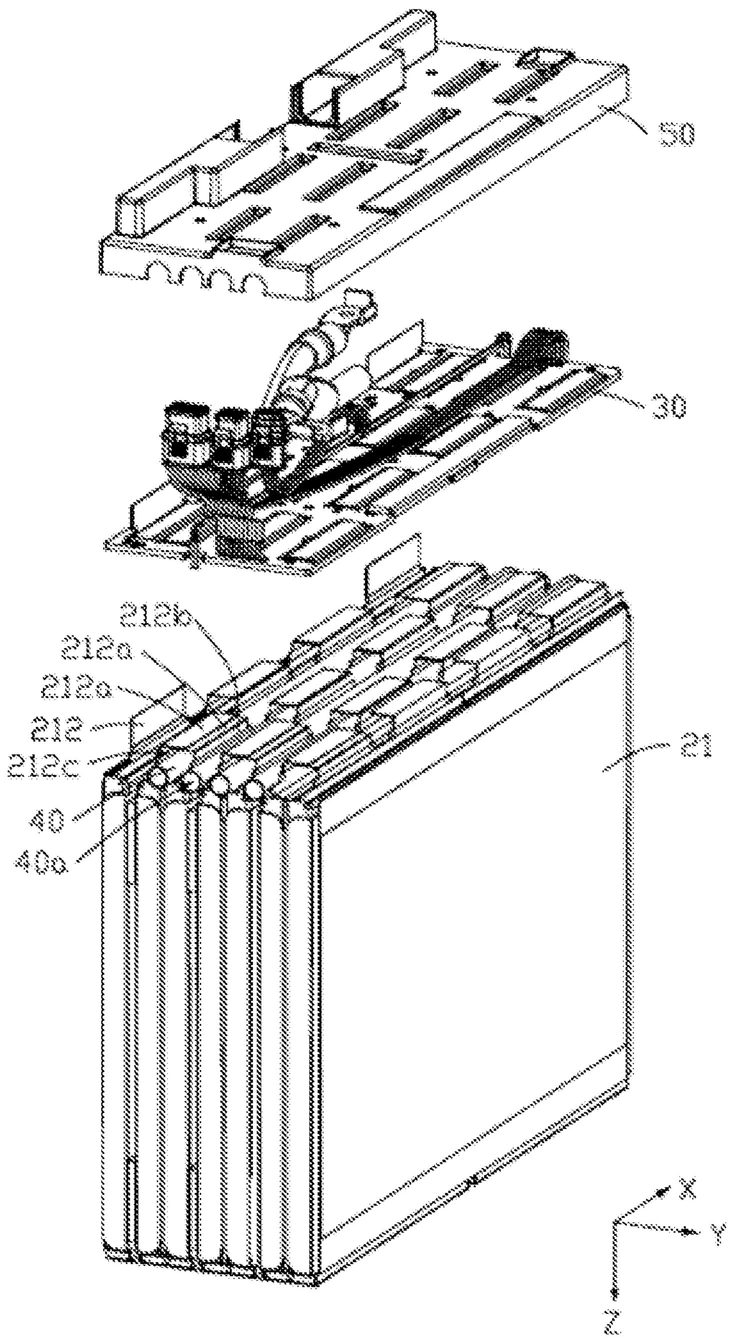
FIG. 6 is a partial schematic exploded view of a battery module according to some embodiments.
Figure 7:
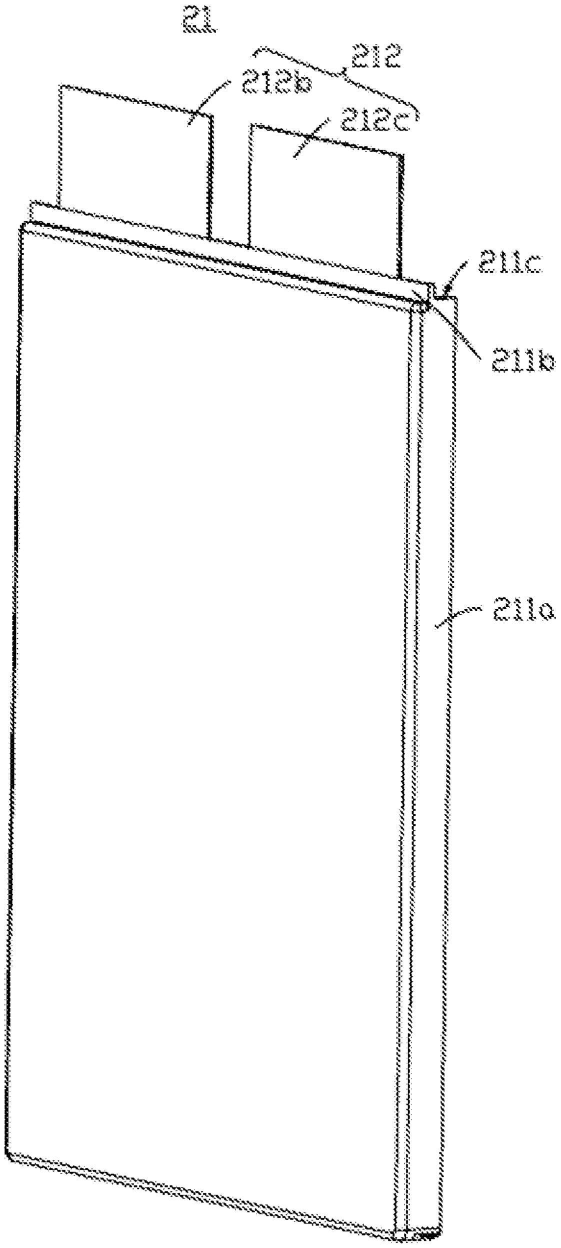
FIG. 7 is a structural schematic diagram of a cell according to some embodiments.
Figure 8:
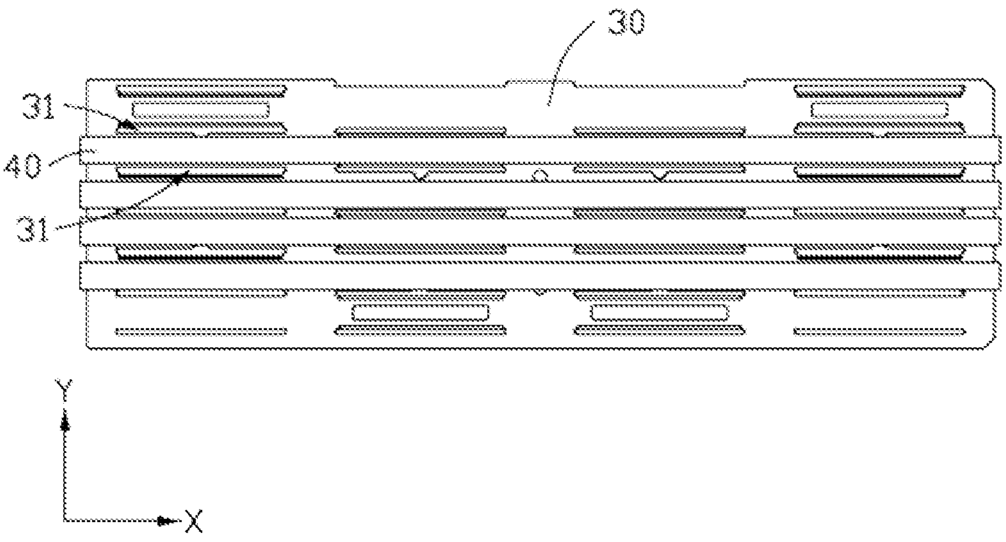
FIG. 8 is a structural schematic diagram of a circuit board and a first connecting member according to some embodiments.

Referring to FIG. 5, FIG. 6, and FIG. 7, in an embodiment, the cell assembly 20 includes a plurality of cells 21 stacked in a second direction Y. The cell 21 includes a cell housing 211, an electrode assembly (not shown in the figure) disposed in the cell housing 211, and an electrode terminal 212 connected to the electrode assembly and led out of the cell housing 211. In an embodiment, the electrode assembly includes a wound structure formed by a positive electrode plate, a negative electrode plate, and a separator through winding. In some other embodiments, the electrode assembly may alternatively be of a laminated structure, that is, the positive electrode plate, the separator, and the negative electrode plate are sequentially stacked to form an electrode assembly unit, and then a plurality of electrode assembly units are stacked to form the electrode assembly. In an embodiment, the second direction Y is perpendicular to the first direction X. Optionally, the cell housing 211 includes an aluminum-plastic film. Optionally, the cell 21 includes a pouch cell. In an embodiment, in a third direction Z, a projection of the circuit board 30 and a projection of a part of the electrode terminal 212 extending from the cell housing 211 overlap, where the third direction Z is perpendicular to the first direction X and the second direction Y.

In an embodiment, the cell housing 211 includes a first portion 211*a* and a second portion 211*b*, where the first portion 211*a* accommodates the electrode assembly, the second portion 211*b* connects to the first portion 211*a*, and the electrode terminal 212 extends from the second portion 211*b*. The first portion 211*a* and the second portion 211*b* fit to form a third depression 211*c*. The first connecting member 40 is at least partially located in the third depression 211*c* to use space of the third depression 211*c*, reducing space occupied by the first connecting member 40.

In an embodiment, the electrode terminal 212 is connected to the circuit board 30 and can conduct heat to the circuit board 30, resulting in high temperature of the circuit board 30. In this application, the first connecting member 40 is disposed below the circuit board 30, so that heat is dissipated out of the first through hole 10*a* and the second through hole 10*b* to an external environment via the first channel 40*a*, improving heat dissipation for the circuit board 30.

In an embodiment, temperature around the electrode terminal 212 is higher than temperature around the electrode assembly. The electrode terminal 212 and the electrode assembly have a great temperature difference, causing damage to the cell 21 under a long-term cycling condition and shortening service life of the battery module 100. In this application, the first connecting member 40 is disposed in the third depression 211*c* and is located at a position of the electrode terminal 212, which can take away heat around the electrode terminal 212 and lower temperature of the electrode terminal 212 of the cell 21 in a timely manner, thereby reducing temperature difference between the electrode terminal 212 and the electrode assembly and prolonging service life of the battery module 100.

In an embodiment, the circuit board 30 is provided with an electronic component, and the first connecting member 40 can further improve heat dissipation for the electronic component, prolonging service life of the electronic component and the circuit board 30.

In an embodiment, the electrode terminal 212 is provided with a welding portion 212*a* extending out of the cell housing 211, where the welding portion 212*a* is formed by the electrode terminal 212 through bending. The electrode terminals 212 of adjacent cells 21 are bent toward each other and are connected to the circuit board 30. In an embodiment, the electrode terminal 212 includes a first terminal 212*b* and a second terminal 212*c*, the first terminal 212*b* and the second terminal 212*c* are opposite in polarity, one of the first terminal 212*b* and the second terminal 212*c* is a positive electrode terminal, and the other is a negative electrode terminal. In the third direction Z, a projection of the first terminal 212*b* of a cell 21 and a projection of the second terminal 212*c* of an adjacent cell 21 at least partially overlap. The third direction Z is perpendicular to the first direction X and the second direction Y. The first terminal 212*b* and the second terminal 212*c* of adjacent cells are bent toward each other, and the welding portion 212*a* of the first terminal 212*b* and the welding portion 212*a* of the second terminal 212*c* are stacked and connected with each other. The welding portions 212*a* of adjacent cells 21 are connected with each other, so that the welding portions 212*a* are connected to the circuit board 30, reducing steps of a manufacture process.

In another embodiment, in the third direction Z, the projection of the first terminal 212*b* of the cell 21 and a projection of the first terminal 212*b* of the adjacent cell 21 may also at least partially overlap; and the first terminal 212*b* of the cell 21 and the first terminal 212*b* of the adjacent cell 21 are connected through the circuit board 30 to implement parallel connection between the cells 21.

In an embodiment, for the electrode terminal 212 and the first connecting member 40, the thermally conductive member connects the first connecting member 40 and the electrode terminal 212 and transfers heat of the electrode terminal 212 to the first connecting member 40.

In an embodiment, the circuit board 30 is provided with a plurality of groups of communicating holes disposed in the first direction X, where each group of the communicating holes includes a plurality of third through holes 31, and the plurality of third through holes 31 are disposed in the second direction Y. the third through hole 31 extends in the first direction X. The electrode terminal 212 passes through the third through hole 31 and connects to the circuit board 30 through the welding portion 212*a*. Further, the welding portion 212*a* and the circuit board 30 are connected through welding, where the welding includes laser welding, ultrasonic welding, and the like. In another embodiment, the welding portion 212*a* and the circuit board 30 may alternatively be connected through another manner such as a conductive adhesive. In an embodiment, the circuit board 30 may be a circuit board with a battery management system to implement intelligent management and maintenance of all battery units, reduce overcharge and over discharge of a battery, prolong service life of the battery, and monitor a condition of the battery.

In some embodiments, the circuit board 30 includes a conductive sheet (not shown in the figure), where the welding portion 212*a* is welded to the conductive sheet.

In an embodiment, when observed in a direction opposite to the third direction Z, the first connecting member 40 is disposed between adjacent third through holes 31, implementing better heat dissipation for the welding portions 212*a* located on two sides of the first connecting member 40. In the third direction Z, a projection of the first connecting member 40 is located between projections of adjacent third through holes 31. Further, in the third direction Z, the projection of the first connecting member 40 and the projection of the third through hole 31 are spaced apart from each other, reducing interference between the first connecting member 40 and the electrode terminal 212.

In an embodiment, the first connecting member 40 includes a thermally conductive material, for example, aluminum. In an embodiment, the first connecting member 40 includes a thermally conductive metal material and a thermally conductive insulation material, where the insulation material may cover an outer surface of the thermally conductive metal material to enhance insulation between the first connecting member 40, the cell, and the circuit board.

In an embodiment, in the first direction X, two ends of the first connecting member 40 protrude out of the circuit board 30, facilitating assembly and reducing interference between the circuit board 30 and the first connecting member 40.

Figure 9:
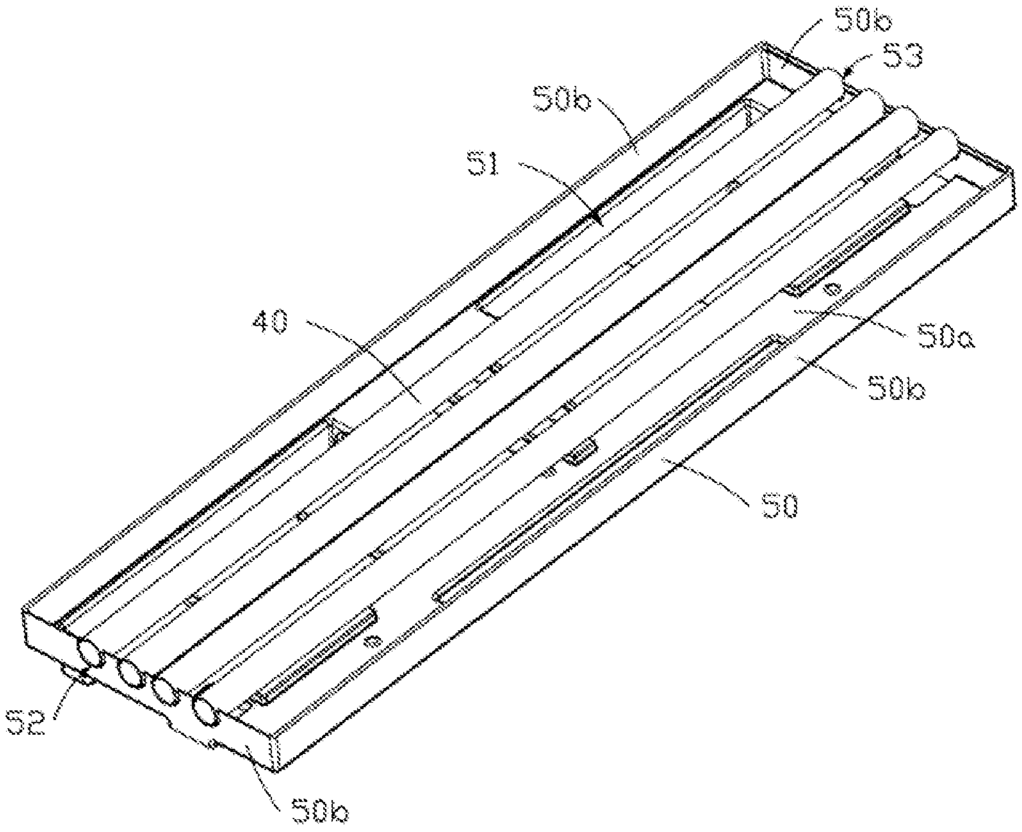
FIG. 9 is a structural schematic diagram of a first structural member and a first connecting member according to some embodiments.
Figure 10:
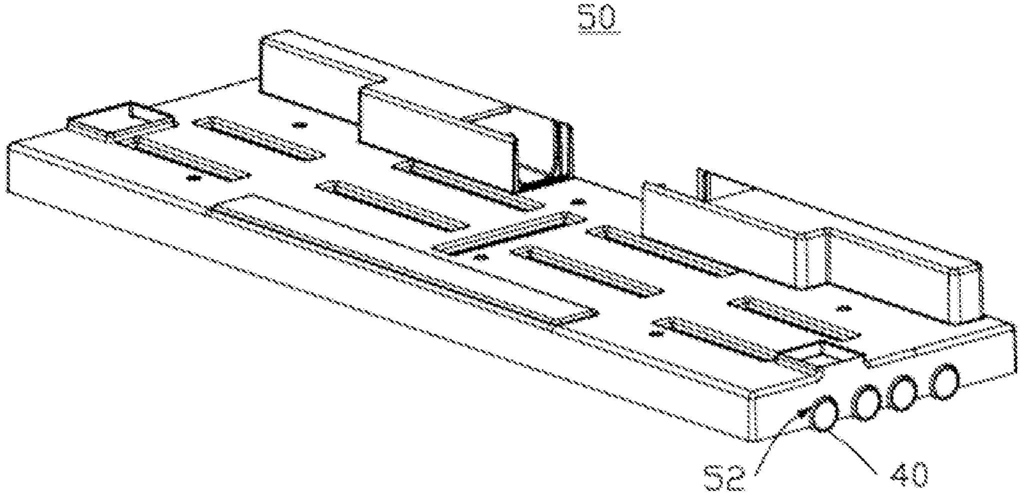
FIG. 10 is a structural schematic diagram of the first structural member according to FIG. 9 from another perspective.

Referring to FIG. 6, FIG. 9, and FIG. 10, in an embodiment, the battery module 100 further includes a first structural member 50, where the first structural member 50 includes a top plate 50*a* and a side plate 50*b* connecting to a peripheral side of the top plate 50*a*, the top plate 50*a* and the side plate 50*b* form a fourth depression 51, and the circuit board 30 is disposed in the fourth depression 51. The side plate 50*b* is provided with a first opening 52 and a second opening 53, where the first opening 52 and the second opening 53 may be disposed in the first direction X. One end of the first connecting member 40 is disposed at the first opening 52, and another end thereof is disposed at the second opening 53. The circuit board 30 is disposed between the top plate 50*a* and the first connecting member 40, and the first connecting member 40 is at least partially disposed in the fourth depression 51 to limit the circuit board 30 in the fourth depression 51. Optionally, in the first direction X, the projection of the first connecting member 40 and a projection of the side plate 50*b* partially overlap, enabling the first connecting member 40 to be partially disposed in the fourth depression 51. Optionally, in the first direction X, the projection of the first connecting member 40 and the projection of the side plate 50*b* overlap, so that the first connecting member 40 is entirely disposed in the fourth depression 51. Optionally, two ends of the first connecting member 40 protrude out of the side plate 50*b* and are connected to the first protrusion 111 and the second protrusion 121, facilitating limitation on a position of the first connecting member 40. Optionally, an insulation layer is provided in the fourth depression 51 to bond and fasten the circuit board 30, the first connecting member 40, and the first structural member 50. The insulation layer may be formed of an insulation material cured after being injected into the fourth depression 51. The insulation material includes at least one of a thermally conductive adhesive or a potting adhesive.

In an embodiment, the first connecting member 40 is disposed at the first opening 52 and the second opening 53 through a third adhesive. Optionally, the third adhesive includes a sealant.

Figure 11:
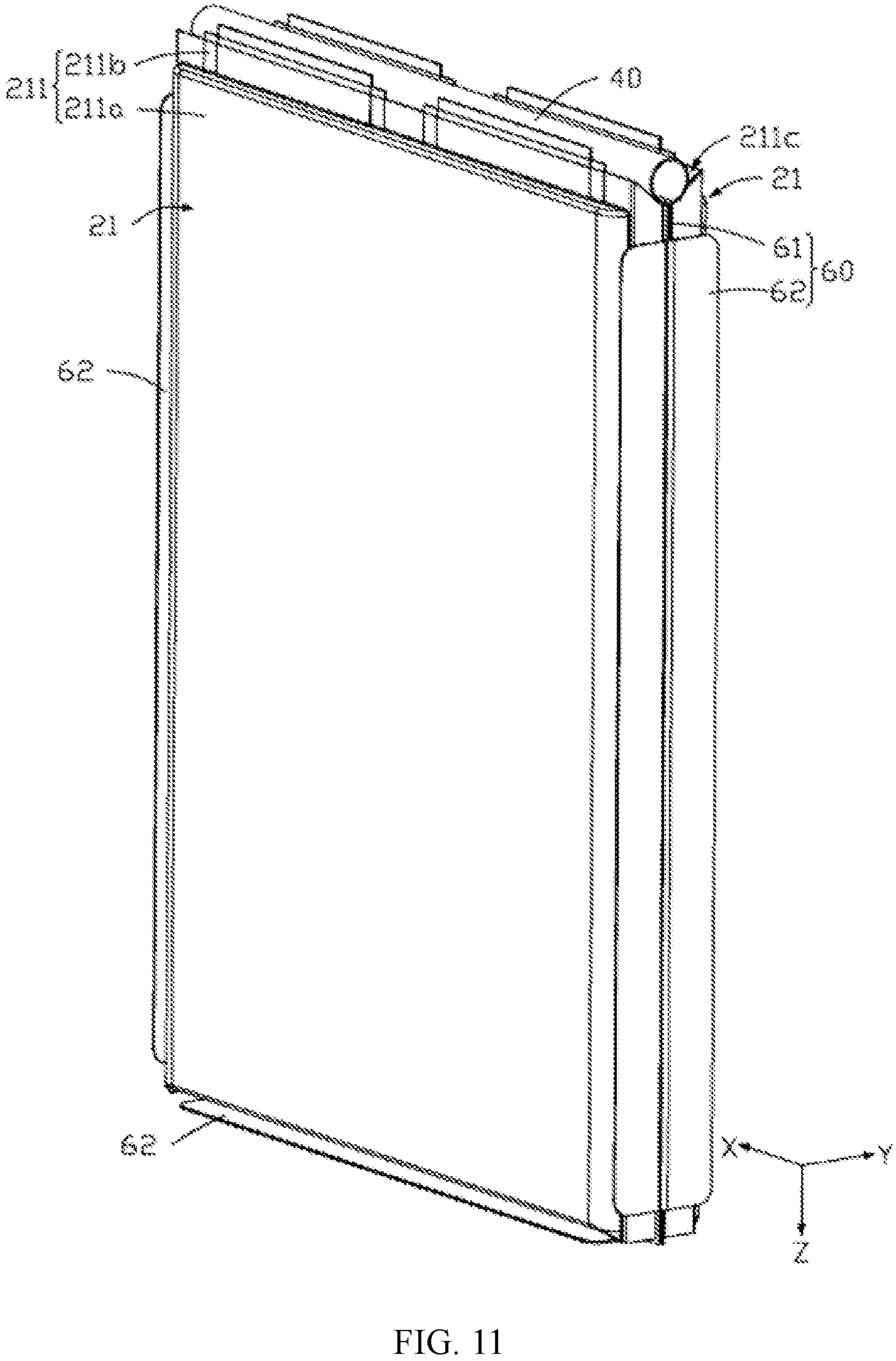
FIG. 11 is a structural schematic diagram of a second connecting member and a cell according to some embodiments.
Figure 12:
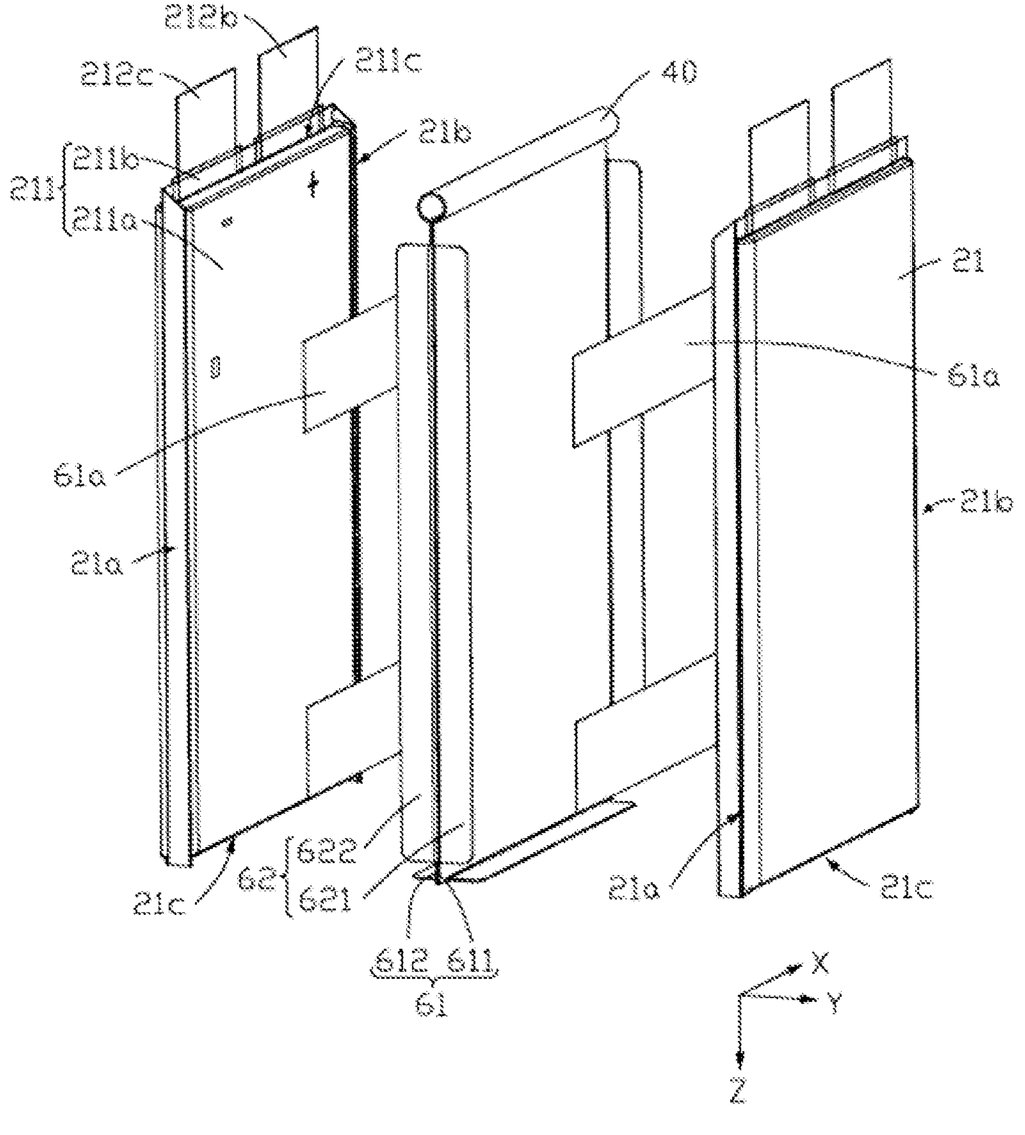
FIG. 12 is a schematic exploded view of a second connecting member and a cell according to some embodiments.
Figure 13:
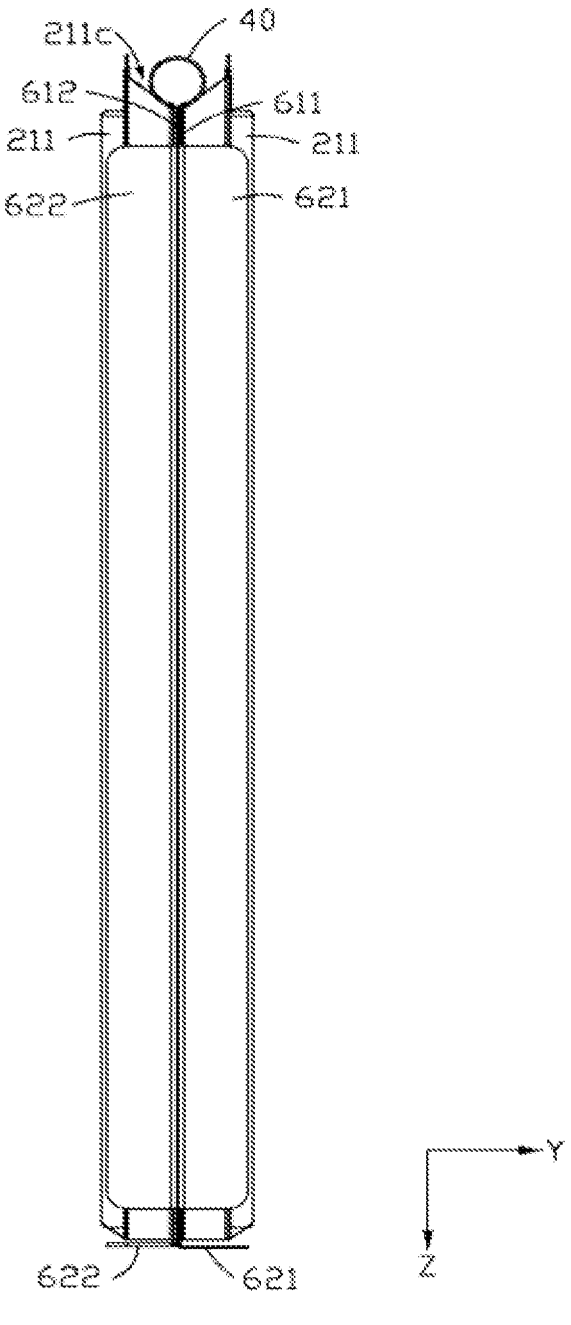
FIG. 13 is a structural schematic diagram of a second connecting member and a cell according to some embodiments from another perspective.

Referring to FIG. 11, FIG. 12, and FIG. 13, in an embodiment, the battery module 100 includes a second connecting member 60. The second connecting member 60 connects to the first connecting member 40, and surfaces of the first connecting member 40 and the second connecting member 60 are provided with an insulation layer, reducing a risk of short circuit between the first connecting member 40 and the second connecting member 60 and the cell 21 and the circuit board 30.

In an embodiment, the second connecting member 60 includes a first component 61, and the first connecting member 40 and the first component 61 are disposed in the third direction Z. The first component 61 is disposed between adjacent cells 21, implementing heat dissipation for the adjacent cells 21. In the second direction Y, a projection of the first component 61 and a projection of the cell housing 211 at least partially overlap. Optionally, in the second direction Y, the projection of the first component 61 is located in a projection area of the cell housing 211. The first component 61 being disposed between the adjacent cells 21 enables two surfaces of the cell 21 disposed in the second direction Y both to be in contact connection with the first component 61 and the first component 61 to cover two surfaces of the cell housing 211, increasing a contact area between the first component 61 and the cell housing 211 and improving heat dissipation for the adjacent cells 21.

In an embodiment, the first component 61 is bonded to the cell housing 211 through a fourth adhesive 61*a*.

In an embodiment, the second connecting member 60 further includes a second component 62, where the second component 62 connects to the first component 61. The second component 62 extends from between adjacent cells 21 and is bent toward the cell 21, enabling the second component 62 to be in contact connection with the cell housing 211. In the first direction X, a projection of the second component 62 and a projection of the cell 21 at least partially overlap. The second component 62 being in contact connection with the cell housing 211 increases a contact area between the second connecting member 60 and the cell housing 211, so that heat is conducted to the second component 62 through the cell housing 211 and then conducted to the first connecting member 40 through the second component 62, thereby improving heat dissipation for the cell 21. In an embodiment, the second component 62 is in contact connection with the housing assembly 10, so that heat is transferred to the housing assembly 10 and is dissipated by the housing assembly 10, thereby further improving heat dissipation for the battery module 100.

Further, the first component 61 includes a first connecting portion 611 and a second connecting portion 612. The first connecting portion 611 and the second connecting portion 612 connect to the first connecting member 40. The first connecting portion 611 and the second connecting portion 612 are disposed opposite each other in the second direction Y, where the first connecting portion 611 is in contact connection with one of two adjacent cells 21, and the second connecting portion 612 is in contact connection with the other of the two adjacent cells 21. The second component 62 includes a third connecting portion 621 and a fourth connecting portion 622. The third connecting portion 621 connects to the first connecting portion 611 and extends from between adjacent cells 21. The third connecting portion 621 is bent toward a cell 21 connected to the first connecting portion 611 and is in contact connection with the cell 21. The fourth connecting portion 622 connects to the second connecting portion 612 and extends from between adjacent cells 21. The third connecting portion 621 is bent toward a cell 21 connected to the second connecting portion 612 and is in contact connection with the cell 21. A contact area between the second component 62 and the adjacent cells 21 is further increased, thereby further improving heat dissipation for the cell 21.

Further, the cell housing 211 includes a first side face 21*a*, a second side face 21*b*, and a third side face 21*c*. The first connecting portion 611 connects to a plurality of third connecting portions 621, and the second connecting portion 612 connects to a plurality of fourth connecting portions 622. One of the third connecting portions 621 and one of the fourth connecting portions 622 extend from between adjacent cells 21 and are in contact connection with the first side face 21*a*, another one of the third connecting portions 621 and another one of the fourth connecting portions 622 extend from between adjacent cells 21 and are in contact connection with the second side face 21*b*, still another one of the third connecting portions 621 and still another one of the fourth connecting portions 622 extend from between adjacent cells 21 and are in contact connection with the third side face 21*c*, and the second component 62 is disposed at the periphery of the cell housing 211, further improving heat dissipation for the cell 21.

In some embodiments, the third connecting portions 621 and the fourth connecting portions 622 may be connected to the first housing 13 to transfer heat to the first housing 13, further improving heat dissipation for the battery module 100.

In an embodiment, the first connecting member 40 and the second connecting member 60 are integrally formed through bending to enhance structural strength of the first connecting member 40 and the second connecting member 60. Optionally, the first connecting member 40 and the second connecting member 60 are an aluminum shell.

Figure 14:
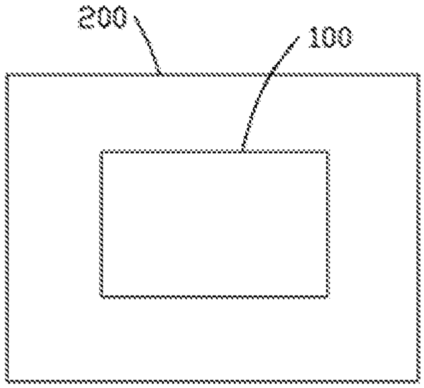
FIG. 14 is a structural schematic diagram of an electric device according to an embodiment.

Referring to FIG. 14, this application further provides an electric device 200 using the foregoing battery module 100. In an embodiment, the electric device 200 in this application may be, but is not limited to, a drone, a backup power source, an electric automobile, an electric motorcycle, an electric motor bicycle, an electric tool, or a large household battery.

Those of ordinary skill in the art should be aware of that the foregoing embodiments are only intended to describe this application, but not to limit this application. Appropriate modifications and variations made to the foregoing embodiments without departing from the essential spirit and scope of this application all fall within the scope of this application.

We claim:

1. A battery module, comprising:

a housing assembly comprising a first side wall and a second side wall, wherein the first side wall is provided with a first through hole, and the second side wall is provided with a second through hole;

a cell assembly accommodated in the housing assembly, wherein the cell assembly comprises cells; each cell comprises a cell housing, an electrode assembly, and an electrode terminal; the electrode assembly is disposed in the cell housing, and the electrode terminal is connected to the electrode assembly and is led out of the cell housing;

a circuit board connected to the electrode terminal;

a first connecting member disposed between the circuit board and the cell housing; and a thermally conductive member disposed between the first connecting member and the electrode terminal;

wherein the first connecting member is provided with a first channel, and the first channel communicates with the first through hole and the second through hole.

2. The battery module according to claim 1, wherein the first side wall and the second side wall are disposed opposite to each other in a first direction, the first side wall is provided with a first protrusion facing towards the second side wall, and the first protrusion is at least partially disposed in the first channel.

3. The battery module according to claim 1, wherein the first side wall is provided with a first protrusion facing towards the second side wall, the first protrusion connects to an edge of the first through hole, the first protrusion is provided with a first hole, the first hole communicates with the first through hole; and the first protrusion is at least partially disposed in the first channel or the first connecting member is partially located in the first hole.

4. The battery module according to claim 1, wherein the second side wall is provided with a second protrusion facing towards the first side wall, and the second protrusion is at least partially disposed in the first channel.

5. The battery module according to claim 1, wherein the second side wall is provided with a second protrusion facing towards the first side wall, the second protrusion connects to an edge of the second through hole, the second protrusion is provided with a second hole, the second hole communicates with the second through hole and the second protrusion is at least partially disposed in the first channel or the first connecting member is partially located in the second hole.

6. The battery module according to claim 2, wherein in a second direction perpendicular to the first direction, the circuit board is provided with a plurality of third through holes, and one electrode terminal passes through one of the plurality of third through hole to connect to the circuit board; and in a third direction, a projection of the first connecting member is located between projections of adjacent ones of the third through holes, wherein the third direction is perpendicular to the first direction and the second direction.

7. The battery module according to claim 1, further comprising a second connecting member, wherein the second connecting member comprises a first component disposed between adjacent ones of the cells, the first component connects to the first connecting member, the first side wall and the second side wall are disposed opposite each other in a first direction, and in a second direction perpendicular to the first direction, a projection of the first component and a projection of the cell housing at least partially overlap.

8. The battery module according to claim 7, wherein the second connecting member further comprises a second component connecting to the first component, the second component extends from between adjacent ones of the cells, the second component is bent toward the adjacent cells and is in contact connection with the cell; and in the first direction, a projection of the second component and a projection of the adjacent cells at least partially overlap.

9. The battery module according to claim 1, wherein the cell housing comprises a first portion and a second portion, the electrode assembly is disposed on the first portion, the second portion connects to the first portion, the electrode terminal extends from the second portion, the first portion and the second portion fit to form a third depression, and the first connecting member is at least partially disposed in the third depression.

10. The battery module according to claim 1, further comprising a first structural member, wherein the first structural member is provided with a fourth depression, the circuit board is disposed in the fourth depression, the first structural member is provided with a first opening and a second opening, the first connecting member is disposed at the first opening and the second opening, and the first connecting member is at least partially located in the fourth depression.

11. The battery module according to claim 10, wherein the fourth depression is provided with an insulation layer; and the insulation layer bonds and fastens the circuit board, the first connecting member, and the first structural member.

12. The battery module according to claim 3, wherein the first connecting member is partially located in the first hole, an adhesive is provided between the first protrusion and the first connecting member, a gap between the first protrusion and the first connecting member is sealed by the adhesive.

13. The battery module according to claim 1, the cell includes a pouch cell.

14. The battery module according to claim 5, wherein the first connecting member is partially located in the second hole, an adhesive is provided between the second protrusion and the first connecting member, a gap between the second protrusion and the first connecting member is sealed by the adhesive.

15. The battery module according to claim 3, wherein the first protrusion is disposed in the first channel, the first connecting member is connected to the first side wall.

16. The battery module according to claim 6, wherein in the third direction, the projection of the first connecting member and the projection of the third through hole are spaced apart from each other.

17. The battery module according to claim 7, wherein the first connecting member and the second connecting member are integrally formed through bending.

18. The battery module according to claim 7, wherein surfaces of the first connecting member and the second connecting member are provided with an insulation layer.

19. An electric device, comprising the battery module according to claim 1.

* * * * *